US006766420B2

(12) United States Patent
Rawson, III

(10) Patent No.: US 6,766,420 B2
(45) Date of Patent: Jul. 20, 2004

(54) SELECTIVELY POWERING PORTIONS OF SYSTEM MEMORY IN A NETWORK SERVER TO CONSERVE ENERGY

(75) Inventor: Freeman Leigh Rawson, III, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 146 days.

(21) Appl. No.: 09/965,008

(22) Filed: Sep. 27, 2001

(65) Prior Publication Data

US 2003/0061448 A1 Mar. 27, 2003

(51) Int. Cl.[7] .............................................. G06F 12/00
(52) U.S. Cl. ...................................... 711/133; 711/118
(58) Field of Search ............................. 711/133, 118, 711/135, 136, 134, 170

(56) References Cited

U.S. PATENT DOCUMENTS

| | | | | |
|---|---|---|---|---|
| 5,390,334 A | * | 2/1995 | Harrison ..................... | 395/750 |
| 5,732,240 A | * | 3/1998 | Caccavale ................... | 395/445 |
| 6,401,181 B1 | * | 6/2002 | Franaszek .................... | 711/170 |
| 6,523,102 B1 | * | 2/2003 | Dye et al. .................... | 711/170 |
| 2002/0087816 A1 | * | 7/2002 | Atkinson ..................... | 711/156 |
| 2002/0154633 A1 | * | 10/2002 | Shin ........................... | 370/389 |

* cited by examiner

Primary Examiner—Kimberly McLean-Mayo
(74) Attorney, Agent, or Firm—Joseph P. Lally; Casimer K. Salys

(57) ABSTRACT

A data processing network, server device, and method in which an application program memory usage parameter is monitored where the parameter is indicative of the server device's performance and loading. If the memory usage parameter exceeds a specified criteria, the amount of the system memory available to the application program is reduced and a physical section of memory is deactivated to save power. The parameter may represent the server application's file cache hit rate and reducing the amount of memory available to the application program may include reducing the file cache size. Reducing the file cache size may include invalidating file cache data based upon a purge criteria that indicates when the data was most recently accessed. If the memory usage parameter falls below the specified criteria, additional system memory made be activated and made available to the application program to maintain performance at a desired level.

22 Claims, 3 Drawing Sheets

SELECTIVELY POWERING PORTIONS OF SYSTEM MEMORY IN A NETWORK SERVER TO CONSERVE ENERGY

BACKGROUND

1. Field of the Present Invention

The present invention generally relates to the field of data processing networks and more particularly to a system and method in which portions of system memory are dynamically deactivated based upon the currency of stored data to reduce power consumption.

2. History of Related Art

In the field of data processing system and networks, server devices and server networks or clusters are widely employed to provide web and web application services. Frequently, the servers in a particular cluster are provided in a rack mounted or other dense configuration in which a large number of server devices are located in close proximity to one another. One of the major goals for operators of these servers is to reduce the amount of electricity that they consume and the amount of heat that they generate. Both goals can be met by reducing the number of watts that they dissipate. Typically, such servers make use of large amounts of memory to cache data that has already been requested on the assumption that there will be other requests for the same information. Although the data is these caches is subject to replacement as new data replaces old data, the cache size generally does not vary considerably over time. The data cache frequently represents a substantial portion of the system memory usage because these servers are typically running few if any other applications. During periods of significant network traffic, a large data cache is desirable to maintain an acceptable cache hit rate. The cache hit rate refers to the probability that a requested file or other data is present in the cache. If a data request "misses" in the cache, a time consuming retrieval of the requested data from persistent storage (disk) is required. During periods of low activity, however, it is possible that an acceptable cache hit rate can be maintained with a considerably smaller data cache. It would be desirable to implement a system and method for adjusting the size of the data cache based upon factors such as the amount of network traffic being serviced to maintain the smallest sized cache required to achieve a desired level of performance. It would be further desirable if portions of the system memory could be dynamically and selectively deactivated when not required for use in the data cache to minimize the power consumption and heat dissipation of the system.

SUMMARY OF THE INVENTION

The problems identified above are in large part addressed by a data processing network, server, and method in which the performance of a file cache associated with an application program running on the server device is monitored. The file cache is then purged of stale data if the performance exceeds a specified criteria and the cache is re-allocated to occupy a smaller number of system memory sections. One or more sections are deactivated following reallocation if the section no longer contains a portion of the file cache. The file cache performance criteria may include the file cache hit rate. Additional memory may be allocated for the file cache if the specified criteria falls below a specified limit and one or more sections of the system memory may be activated if the additional memory comprises a portion of a previously deactivated physical memory section. Deactivating and activating a system memory section may include switching off and on, respectively, power to the section.

BRIEF DESCRIPTION OF THE DRAWINGS

Other objects and advantages of the invention will become apparent upon reading the following detailed description and upon reference to the accompanying drawings in which.

Figure 1:
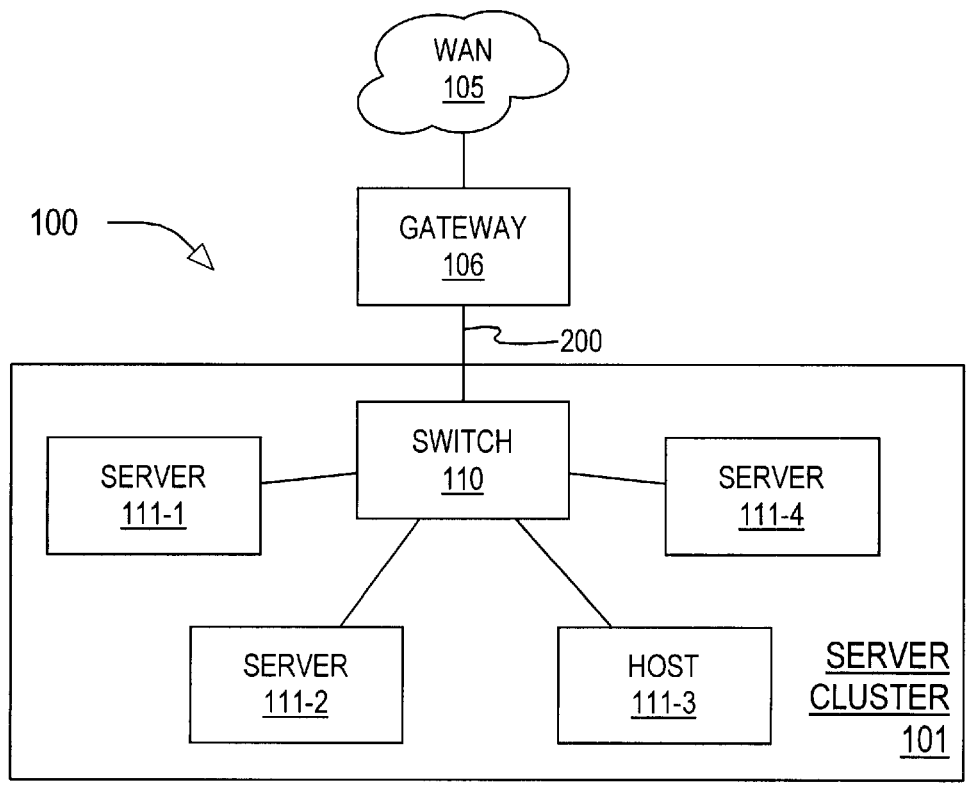
FIG. 1 is a block diagram of selected features of a data processing network.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates a data processing network, server, and method for reducing power consumption and heat dissipation by dynamically and selectively deactivating portions of system memory during operation. The server monitors at least one memory usage parameter, such as the hit rate of a file cache on the server, that provides an estimate of server performance. If the monitored parameter falls outside of a predetermined range, the size of the file cache is adjusted by the server and portions of system memory are activated or deactivated (i.e., powered on or off) as needed. In this manner a desired performance level is maintained as the loading varies while using a minimum amount of system memory.

Turning now to the drawings, FIG. 1 a block diagram of selected features of a data processing network 100 according to one embodiment of the present invention is shown. In the depicted embodiment, data processing network 100 includes a server cluster 101 that is connected to a wide area network (WAN) 105 through an intermediate gateway 106. WAN 105 may include a multitude of various network devices including gateways, routers, hubs, and so forth as well as one or more local area networks (LANs) all interconnected over a potentially wide-spread geographic area. WAN 105 may represent the Internet in one embodiment.

Server cluster 101 as depicted includes a central switch 110 that is connected to the gateway 106 via a network connection 200. Cluster 101 further includes a plurality of servers, four of which are depicted in FIG. 1 and indicated by reference numerals 111-1, 111-2, 111-3, and 111-4 (collectively or generically referred to as server(s) 111). Server cluster 101 may service all requests to a particular universal resource indicator (URI). In this embodiment, client requests to the URI that originate from anywhere within WAN 105 are routed to server cluster 101. Switch 110 may include request distributor software that is responsible for routing client requests to one of the servers 111 in cluster 101. The request distributor may incorporate any of a variety of distribution algorithms or processes to optimize the server cluster performance, minimize energy consumption, or achieve some other goal. Switch 110 may, for example, route requests to a server 111 based on factors such as the current loading of each server 111, the requested content, or the source of the request. The depicted embodiment of server cluster 101 illustrates a switched or point-to-point cluster configuration in which each server 111 is connected to switch 110 through a dedicated connection. In other embodiments, the server cluster may be implemented with a shared media configuration such as a conventional Ethernet or token ring configuration. In the switched embodiment depicted, each server 111 typically includes a network interface card and switch 110 includes a port for each server 111.

Figure 2:
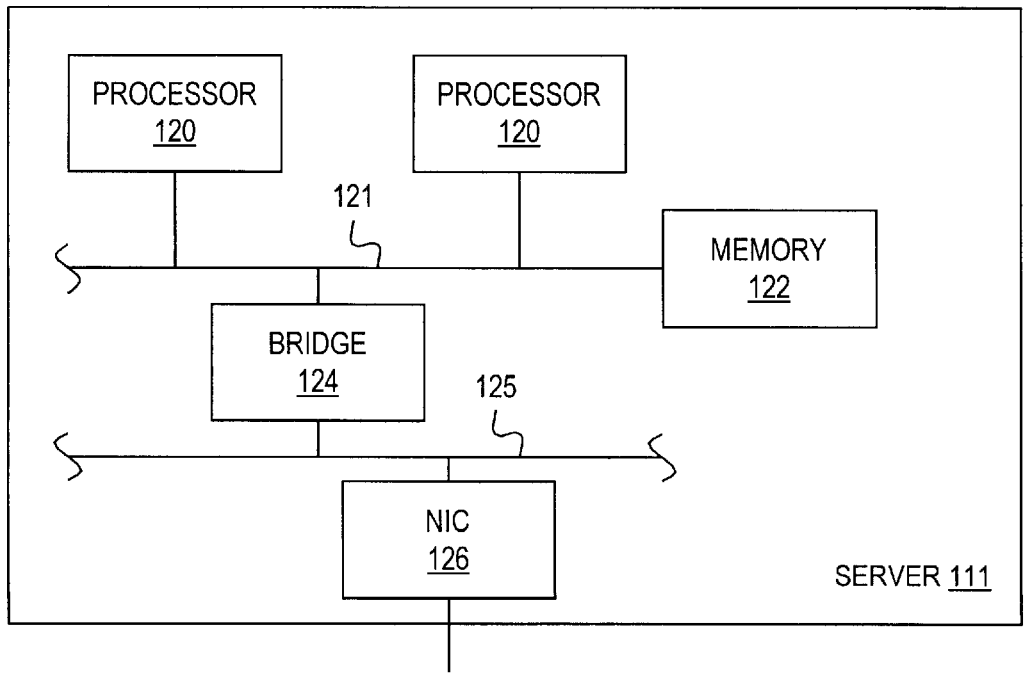
FIG. 2 is a block diagram of selected features of a server device suitable for use in the network of FIG. 1.
Figure 3:
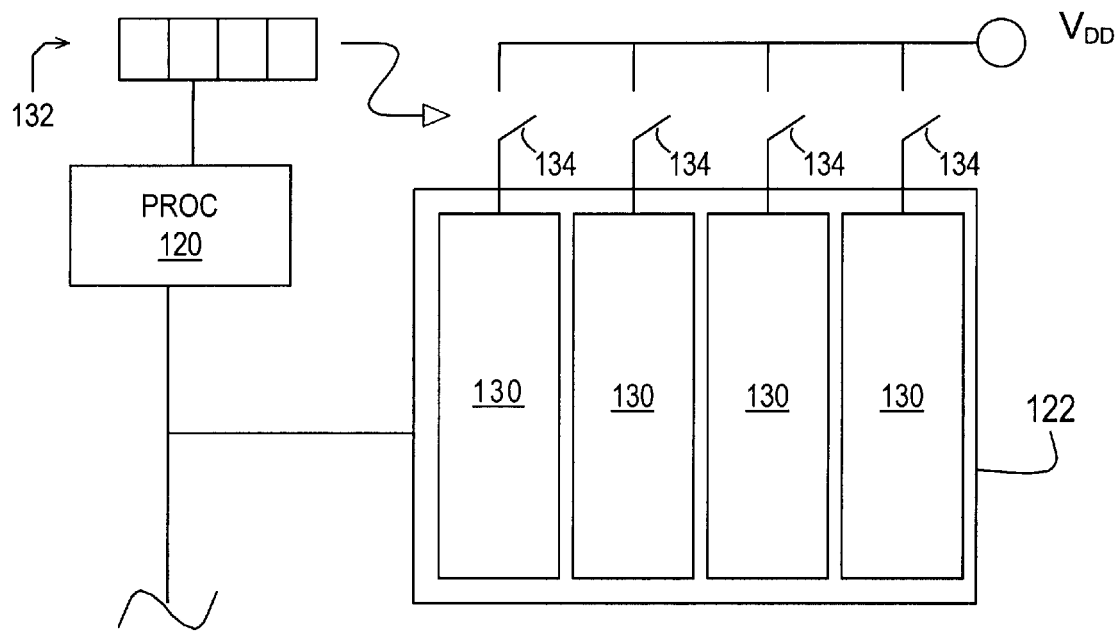
FIG. 3 illustrates additional detail of the server device of FIG. 2.

Referring now to FIG. 2 and FIG. 3, additional detail of an embodiment of server 111 is shown. Server 111 includes one or more general purpose microprocessors 120 that are each connected to a system bus 121. Processors 120 may be implemented with commercially distributed microprocessors such as the PowerPC® family of processors from IBM Corporation, an x86-type processor such as the Pentium® family of processors from Intel, or some other suitable processor. Each processor 120 has access to the system memory 122 of server 111. System memory 122 is a volatile storage element typically implemented with a set of dynamic random access memory (DRAM) devices. Server 111 may further include a bus bridge 124 connected between a peripheral bus 125 and system bus 121. One or more peripheral devices is typically connected to peripheral bus 125. The depicted illustration of server 111 is shown as including a network interface card 126 connected to peripheral bus 125. In this embodiment, NIC 126 enables server 111 to connect to the network medium that connects the servers and any other network devices in server cluster 101.

Those familiar with semiconductor memory components will appreciate that system memory 122 employs an array of memory cells, each capable of storing charge on a small capacitive structure. The amount of charge on any given cell capacitor determines the logical state of the cell. Because DRAM capacitors are extremely small and vulnerable to leakage current, they must be continuously refreshed to maintain their contents. In a typical refresh cycle, one row of the DRAM device is refreshed at a time by selecting the row using a Row Address Select (RAS) signal. During refresh, the row address is incremented on each RAS cycle such that the rows are refreshed in succession. The clocking of the RAS signal and the continuous switching of the row address data signals produce transitions in the internal state of the DRAM device that cause transition currents. Thus, the refresh cycle in a DRAM device requires a continues and not-insignificant current. This refresh current contributes to the energy cost of server cluster 101 and the heat dissipated by the cluster, both of which are of considerable concern in a dense server application where there may be an entire room full of servers 111 each consuming power and generating heat in a densely packed configuration.

As exemplified by the embodiment of server 111 depicted in FIG. 3, the system memory 122 of server 111 is physically and logically divided into sections 130. Although the depicted embodiment illustrates four such sections 130, alternative implementations may employ fewer or more sections. Each section 130 is capable of being powered independently of the remaining sections. In the depicted embodiment, a memory section register 132 includes at least one bit corresponding to each section 130 of system memory 122. Memory section register 132 is accessible to and programmable by processor 120 of server 111. When the appropriate bit or bits in register 132 are set, a corresponding section 130 in system memory 130 may be connected to a source of DC power ($V_{DD}$) through an appropriate switching mechanism, which is represented in FIG. 3 by the set of switches 134.

Portions of the present invention may be implemented as a sequence or set of computer executable instructions (i.e., software) stored on a computer readable medium or storage element. When the instructions are being executed, portions of the software may reside in a volatile storage element such as system memory 122 or an internal cache memory (not depicted) of processor 120. At other times, the software may be stored in a persistent or non-volatile storage element such as a floppy diskette, hard drive, CD ROM, flash memory device, magnetic tape, or another suitable storage element.

Generally speaking server 111 is configured to adjust the size of its active memory by powering selected physical memory sections 130 to maintain a reasonably constant level of performance as server loading varies while minimizing energy consumed and heat dissipated by powering the system memory. To accomplish this goal, the server may monitor the memory usage of an application running on the server to obtain an estimate of the server's overall performance or response time. The monitored memory usage parameter typically varies with the loading experienced by the server device. When the monitored parameter falls above or below a desired range, the amount of memory available to the application program is adjusted to bring the monitored parameter, as well as the server performance, back within the desired range. This adjustment of memory may include activating or deactivating one or more sections of system memory such that the amount of active memory is driven by the server's performance. As server loading increases during times of heavy network traffic, a presumably larger amount of active memory is required to sustain a desired performance level. Conversely, less active memory may be required during times of low loading.

Thus, server 111 typically includes software or code executable by processor 120 that monitors the usage of system memory 122. In a server cluster application, the code that is executing on server 111 may be primarily comprised of the server's operating system and a web-based application or service. Under these conditions, a substantial portion of system memory may be devoted to storing of data or information that was previously computed or retrieved from a permanent storage facility by the web application or service in response to a client request. This portion of system memory 122 is referred to herein as the file cache of system memory 122.

It will be appreciated by those skilled in the field of microprocessor-based data processing systems and operating systems that the selectively powerable sections 130 of system memory 122 typically represent physically contiguous portions of memory 122. It will be further appreciated that the operating system of server 111 more than likely employs some form of virtual memory and memory paging such that logically continuous pages of memory are not necessarily physically contiguous. Moreover, the granularity or size of logical memory pages is typically significantly smaller than the granularity or size of selectively powerable sections 130 of memory 122. Under these assumptions and the additional assumption that the section(s) 130 of system memory 122 containing the operating system and application code are unlikely candidates for powering off, the present invention desirably implements a paging strategy in which operating system and application pages are maintained in a minimum of sections 130 while the remaining sections are devoted primarily or exclusively for the file cache.

Figure 4:
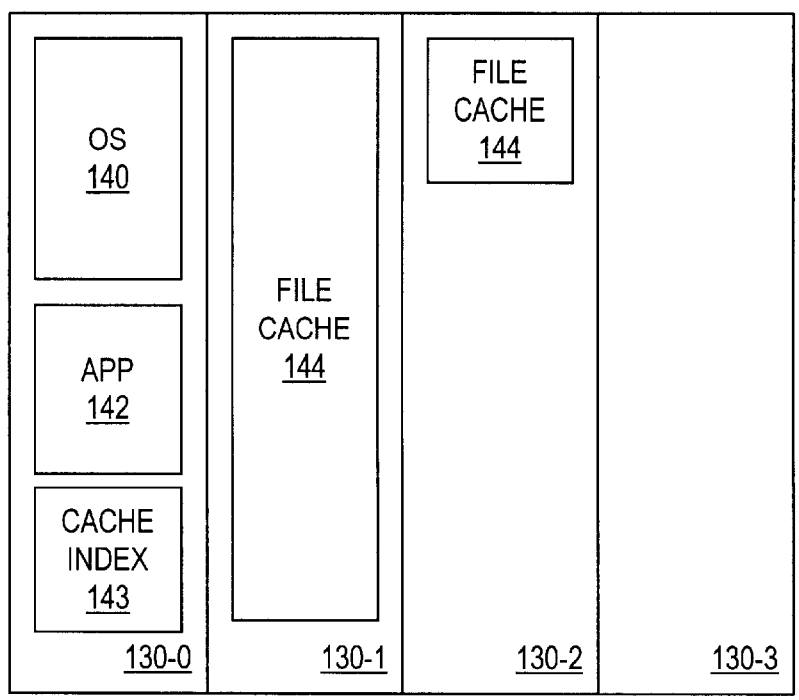
FIG. 4 is a conceptualized illustration of a system memory of the server device of FIG. 2.

Referring to FIG. 4, a conceptualized depiction of system memory 122 is depicted. In the illustrated example, a first selectively powerable section 130 of memory 122 (identified by the specific reference numeral 130-0) is allocated for operating system code identified by reference numeral 140 and a web-based application or server 142. Although each of these items is indicated by a single block in the figure for the sake of simplicity, each may represent multiple logical memory pages that are not necessarily physically contiguous within block 130-0. The remaining blocks 130-1, 130-2, and 130-3 are primarily or exclusively dedicated to a file cache 144 associated with application 142. File cache 144 includes information that has been previously retrieved from disk storage and/or computed by application 142. As depicted in FIG. 4, file cache 144 may occupy portions of multiple system memory sections 130.

An index 143 of the data currently stored in file cache 144 is maintained by application 142 in conjunction with operating system 140. Operating system 140 is preferably configured to use file cache index 143 to monitor one or more parameters associated with file cache 144. File cache index 143 may, for example, include information about the data stored in file cache 144, such as the time when the data was last accessed, from which least-recently-used information about the files or other data in file cache 144 may be determined. In one embodiment, operating system 140 may invalidate or delete data in file cache 144 that has not been accessed within a specified duration. The specified duration itself may be a constant value or may be a variable determined by other parameters such as the current loading or amount of traffic being serviced by server 111. During periods of heavy traffic, the duration may be decreased to eliminate stale items more quickly while, during periods of little activity, the age limit may be increased to retain items longer.

In another embodiment, the memory usage parameter monitored by operating system 140 may be the file cache hit rate of application 142. The file cache hit rate refers to the ratio of the data requests processed by application 142 that are serviceable from file cache 144 to the total number of such requests. Thus, the file cache hit rate represents the probability that a requested data file or object is currently stored in tile cache 144. The file cache hit rate is an indicator of server performance because a low hit rate implies poor performance due to relatively frequent accesses to a pexrnanent storage facility, whether it be an internal disk of server 111 or networked storage such as a network attached storage (NAS) device.

An extremely high file cache hit rate, while desirable from a pure performance perspective, may indicate that the file cache size is too large for the current loading and that acceptable system performance could be achieved with a smaller cache size. In one embodiment of the invention, the size of file cache 144 is determined at least in part by the file cache hit rate. If the hit rate exceeds some specified limit, the operating system may reduce the size of memory available to application program 142 by reducing the size of file cache 144. This process will typically include the operating system invalidating appropriate data in file cache index 143 and deallocating corresponding portions of system memory 122. The data that is invalidated may be selected based upon its age, a least-recently-accessed determination, or some other criteria. In a least-recently-accessed configuration, file cache index 143 includes information indicating when the corresponding data was most recently accessed. This access information may be used as a proxy for determining what data is most likely to be accessed next. Data in file cache 144 that has not been accessed recently is purged while data that has been accessed recently is maintained. Like the age limit determination discussed previously, the recent access limit may be a static value or it may vary depending upon loading or other considerations.

Figure 5:
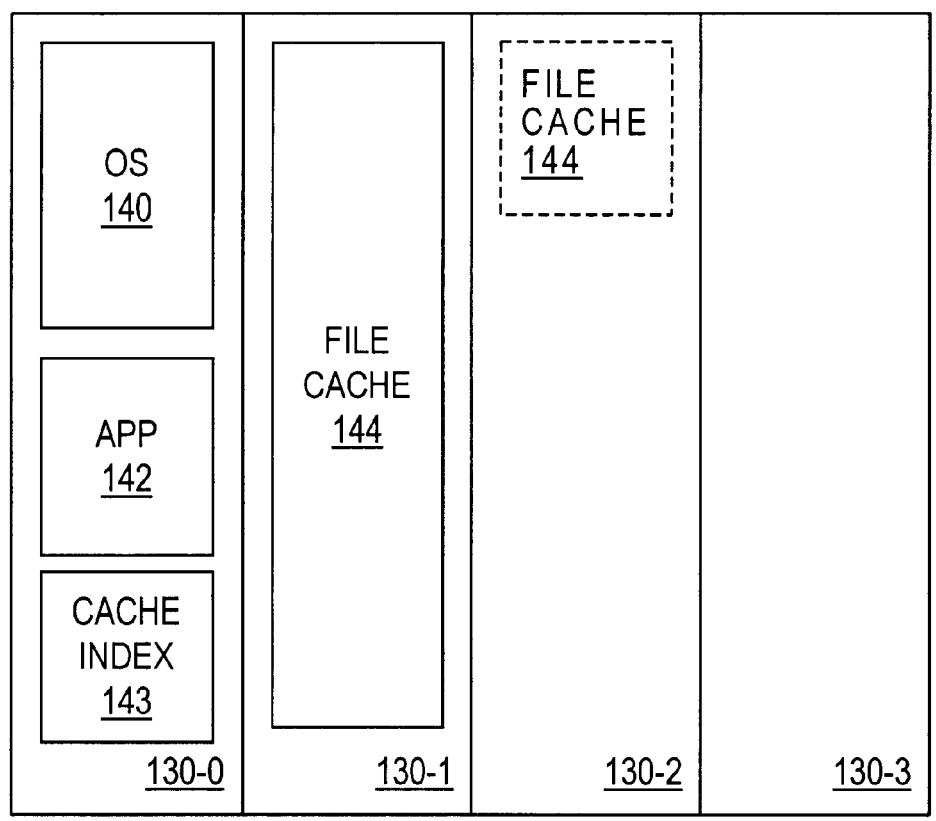
FIG. 5 is a conceptualized illustration of the system memory of FIG. 4 following reallocation of a file and deactivation of a system memory section.

Regardless of the specific manner in which the size of file cache 144 is reduced, operating system 140 determines whether any file cache sections 130 may be deactivated following a reduction in the file cache size. After one or more files or other data within file cache 144 have been invalidated and the corresponding memory deallocated by operating system 140, file cache 144 may be re-arranged by operating system 140 to pack the file cache into the fewest possible physical sections 130 of system memory 122. Referring to FIG. 5, a conceptual illustration of the physical memory depicted in FIG. 4 following a reduction of file cache 144 is presented. In this illustration, sufficient data has been purged from file cache 144 to enable operating system 140 to pack the file cache into a single section 130 of system memory 122. Following this reduction and reallocation of file cache 144, section 130-2 is eligible for deactivation. Referring back to FIG. 3, processor 120 may deactivate a section 130 of system memory 122 by setting an appropriate bit or set of bits in memory section register 132 to open a switch 134 between the power supply voltage $V_{DD}$ and a corresponding system memory section 130.

By dynamically monitoring the size and usage of a web application file cache, adjusting the size of the file cache to achieve a specified performance criteria, and deactivating physical sections of physical memory when possible, the present invention reduces the server's energy consumption and heat dissipation without substantially reducing server performance or increasing its cost. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of operating a server device including a processor and a system memory within a server cluster, the method comprising:

monitoring the hit rate of a file cache on the server device;

responsive to determining that the file cache hit rate exceeds a specified threshold, reducing the size of the file cache thereby freeing at least a portion of the system memory; and responsive to the reduction resulting in a separately powerable section of system memory being unallocated, turning off power to the section.

2. The method of claim 1, wherein reducing the size of the file cache includes invalidating selected data the file cache based upon a purge criteria.

3. The method of claim 2, wherein the purge criteria indicates the most recent access of the corresponding data.

4. The method of claim 1, further comprising, responsive to determining that the memory usage parameter falls below the specified criteria, allocating additional system memory available to the application program.

5. The method of claim 4, wherein allocating additional system memory available to the application program includes increasing the size of the file cache and activating a system memory section if the increased file cache includes a portion of a previously deactivated section of physical memory.

6. The method of claim 1, wherein the monitored memory usage parameter varies with loading experienced by the server device.

7. The method of claim 1, further comprising, allocating logical pages to an operating system and the application program to occupy a minimum number of physical memory sections.

8. The method of claim 7, wherein turning off power to the memory section includes setting a bit in a memory section register wherein the bit corresponds to the memory section.

9. A computer program product residing on a computer usable medium for reducing power consumption in a server device, comprising:

computer code means for monitoring the hit rate of a file cache on the server device, wherein a low hit rate is indicative of low server performance and a high hit rate is indicative of high server performance;

code means for reducing the size of the file cache and thereby freeing at least a portion of the system memory responsive to determining that the file cache hit rate is higher than a specified threshold; and code means for powering off a section of the system memory responsive to the reduction in the size of the file cache.

10. The computer program product of claim 9, wherein the code means for reducing the size of the file cache includes code means for invalidating selected data in the file cache based upon a purge criteria.

11. The computer program product of claim 10, wherein the purge criteria indicates the most recent access of the corresponding data.

12. The computer program product of claim 9, further comprising, code means for increasing the size of the file cache responsive to determining that the file cache hit rate falls below a specified threshold.

13. The computer program product of claim 12, further comprising code means for activating a system memory section if the additional system memory includes a portion of a previously deactivated section of physical memory.

14. The computer program product of claim 9, further comprising, code means for allocating logical pages to an operating system and the application program to occupy a minimum number of physical memory sections.

15. The computer program product of claim 14, wherein the code means for powering off the system memory section includes code means for altering a bit, corresponding to the system memory section, in the memory section register.

16. A data processing server device including processor and a system memory comprising selectively powerable system memory sections, the memory containing:

computer code means for monitoring the hit rate of a file cached on the server device;

code means for reducing the size of the file cache responsive to determining that the file cache hit rate exceeds a specified criteria; and code means for powering off a section of the system memory if the entire section is unallocated responsive to the file cache size reduction.

17. The server device of claim 16, wherein the code means for reducing the size of the file cache includes code means for invalidating selected data in the file cache based upon a purge criteria.

18. The server device of claim 17, wherein the purge criteria indicates the most recent access of the corresponding data.

19. The server device of claim 16, further comprising, code means for allocating additional system memory to the file cache responsive to determining that the file cache hit rate falls below a specified threshold.

20. The server device of claim 19, further comprising code means for activating a system memory section if the additional system memory includes a portion of a previously deactivated section of physical memory.

21. The server device of claim 16, further comprising, code means for allocating logical pages to an operating system and the application program to occupy a minimum number of physical memory sections.

22. The server device of claim 21, wherein the code means for powering off the memory section includes code means for altering a bit in a memory section register wherein the altered bit corresponds to the memory section.

* * * * *